United States Patent [19]

Seki et al.

[11] 4,250,522
[45] Feb. 10, 1981

[54] COLOR FACSIMILE PREVIEWER

[75] Inventors: Ikuo Seki, Tokyo; Masahiko Kato, Kodaira, both of Japan

[73] Assignee: Toppan Printing Co., Ltd., Tokyo, Japan

[21] Appl. No.: 4,289

[22] Filed: Jan. 17, 1979

[30] Foreign Application Priority Data

Jan. 20, 1978 [JP] Japan ................................ 53/4348

[51] Int. Cl.³ .............................................. H04N 1/46
[52] U.S. Cl. .................................................. 358/76
[58] Field of Search .................. 358/76, 80, 78, 79, 358/77, 75, 42

[56] References Cited

U.S. PATENT DOCUMENTS

| 2,976,348 | 3/1961 | Bailey et al. | 358/76 |
| 2,993,954 | 7/1961 | Allen et al. | 358/80 |
| 3,450,830 | 6/1969 | Kyte | 358/80 |
| 3,972,066 | 7/1976 | Seki et al. | 358/76 |
| 4,037,249 | 7/1977 | Pugsley | 358/76 |

FOREIGN PATENT DOCUMENTS

| 49-40819 | 4/1974 | Japan | 358/76 |
| 50-159610 | 12/1975 | Japan | 358/76 |
| 53-55202 | 5/1978 | Japan | 358/76 |

Primary Examiner—John C. Martin

[57] ABSTRACT

A color separation condition determining apparatus which is useful for determining the operation conditions of the color separation step in a color printing process, comprises a scanning section, a masking circuit, an under-color removal circuit, clip circuits, gradation a correction circuit, color correction circuit, a matrix circuit and a color monitor using a color CRT. The invention further includes a method for correcting color signals in the above apparatus and a masking circuit therefor.

13 Claims, 12 Drawing Figures

COLOR FACSIMILE PREVIEWER

BACKGROUND OF THE INVENTION (1) Field of the Invention

This invention relates to an apparatus having a color monitor for determining color separation conditions and a method for correcting the color signals and a masking circuit therefor.

When color pictures are printed by using color originals such as color photographs, color separation films are prepared by separating the colors of the original by means of a color separation device such as a color scanner.

The present invention relates to an apparatus for determining the color separation conditions. A color original is first scanned to obtain electrical signals representing the image, the image signals are corrected so as to be printed desirably, and in order to make the image on a color monitor practically exactly the same as the image that will be actually printed, the corrected image signals are further corrected. By developing the twice-corrected image signals on the color monitor, the conditions for the color separation process can be accurately determined. The present invention further relates to the method for the above color signal correction and to the masking circuit which is used in the above apparatus.

(2) Description of Prior Art

Printing a color original such as a color photograph comprises the following three steps in general. The first step is color separation, in which color separation films are prepared by separating the colors of the original picture by means of a color separation device such as a color scanner. The second step is preparing the printing plates from the color separation films. In the third step the printing plates are attached to a printing press and the printed matter is produced.

In this process, a fully-colored image is obtained only in the final actual printing step, and it is therefore quite difficult to ensure that the final printings will have good colors.

For example, in the case that the tone of color is not desirable in the original picture, each color is conventionally corrected in the intermediate steps (mainly in the color separation step), but, it is difficult to judge whether the correction made is adequate or not until the final printed matter is produced.

To remedy this problem, so-called previewing apparatus has been proposed recently, in which apparatus an image that accurately represents the image that will actually be printed is developed on a color television screen so as to check up the colors of image in each step.

Such apparatus is exemplified by the previewing apparatus of Hazeltine Research, Inc. as disclosed in U.S. Pat. No. 3,131,252, and the apparatus of the present applicants, which is disclosed in U.S. Pat. No. 3,972,066. Apparatus for determining the conditions in color separation step by previewing, is exemplified by an apparatus of Dr.-Ing. Rudolf Hell GmbH disclosed in West German Offenlegungsschrift No. 2,607,623. In the apparatus of Hell GmbH, a previewing device and a color scanning device are combined in series.

In the previewing apparatus of this kind, the most inportant matter is how the image on the color television monitor is to be made an accurate representation of the actually printed image. In addition, when apparatus of this kind is used, it is regulated according to various conditions (by regulating correction factors), and the second important matter is that such regulation be easily carried out.

Many of the conventional apparatuses mentioned above have suffered from inaccurate color reproduction, as well as, in one case, the inconvenience of the method of regulation of the apparatus.

BRIEF SUMMARY OF THE INVENTION

It is, therefore, the primary object of the present invention to provide a novel and improved apparatus for use in the color separation step of color printing.

Another object of the present invention is to provide an apparatus for determining the color separation conditions in which the image developed on a color monitor is an accurate representation of the image that will actually be printed.

A further object of the present invention is to provide such an apparatus which can be operated easily, effectively and reliably.

Still a further object of the present invention is to provide a method for correcting color signals and masking circuits for use in the above-mentioned apparatus.

In accordance with the present invention, the apparatus for determining the color separation conditions is provided with a scanning section, masking circuits, under-color removal circuits, clip circuits, gradation correction circuits, color correction circuits, matrix circuits and a color monitor using a color cathode ray tube (CRT)

BRIEF DESCRIPTION OF THE DRAWINGS

These and other objects and features of the present invention will become clear to those skilled in the art from the following detailed description of the invention with reference to the accompanying drawings, in which:

FIG. 8 to FIG. 11 show the constitution of the masking circuits, in which:

DETAILED DESCRIPTION OF THE INVENTION

When a color original such as a color photograph is color-printed, color separation films of four colors, yellow (hereinafter referred to as "Y"), magenta (hereinafter referred to as "M"), cyan (hereinafter referred to as "C") and black (hereinafter referred to as "Bl"), are prepared by using a color separation apparatus such as a color scanner. The printing plates to be used in the actual printing are prepared from these four color separation films. The printing plates are attached to a printing press and the printing operation is then carried out.

If the color or the gradation of the color original is not good, the color or the gradation is corrected in order to obtain good final printings. This color or gradation correction is done mainly in the color separation step, although it is possible to some degree also in the plate making step, by means of dot etching.

It should be noted, however, that when the color correction is carried out, it is difficult to be sure of the exact degree of color correction necessary. The reason is that the color separation films obtained in the color separation step are four black silver images of Y, M, C and Bl. It is difficult to envision the exact printed full color image from these four silver images.

In order to eliminate this difficulty, several types of previewing apparatus have been proposed, as described above. The largest problem with conventional devices of this kind is that an image formed on a color monitor can not easily be made similar to the actual final printed image. That is, the image on the color monitor is made by providing a color CRT with three primary colors of red (hereinafter referred to as "R"), blue (hereinafter referred to as "B") and green (hereinafter referred to as "G") as an additive mixture, while the printed image is mainly represented on the surface of printing paper by the subtractive mixture of Y, M, C and Bl. Accordingly, the color mixing methods and the primary colors used for the color monitor image and the printed image are different. Furthermore, assuming that there are two electric signals of e.g. 10% and 15% corresponding to two respective color densities, when they are combined additively (that is, on a Braun tube), they are represented as respective densities of 10% and 15%. In the final printed product, however, the colors are represented in a overlapped state so that they are not seen as their proper densities of 10% and 15% but as somewhat lower densities.

Thus the representation of colors in printing is fundamentally different from that in the color CRT, and so a result it is quite difficult to make the image on the color monitor represent the printed image accurately.

In the apparatus of the present invention for determining the color separation conditions, a color original is scanned by a color separation device such as a T.V. camera, and an image which is similar to the image to be printed is developed on a color monitor by applying necessary color corrections. In other words, several correction knobs are manipulated so as to bring the image on the color monitor into the most desirable state, and the values of correction needed in the actual color separation can be obtained from the corresponding knob settings (corrected values in the apparatus).

In the following, the present invention will be described in more detail with reference to the accompanying drawings.

Figure 1:
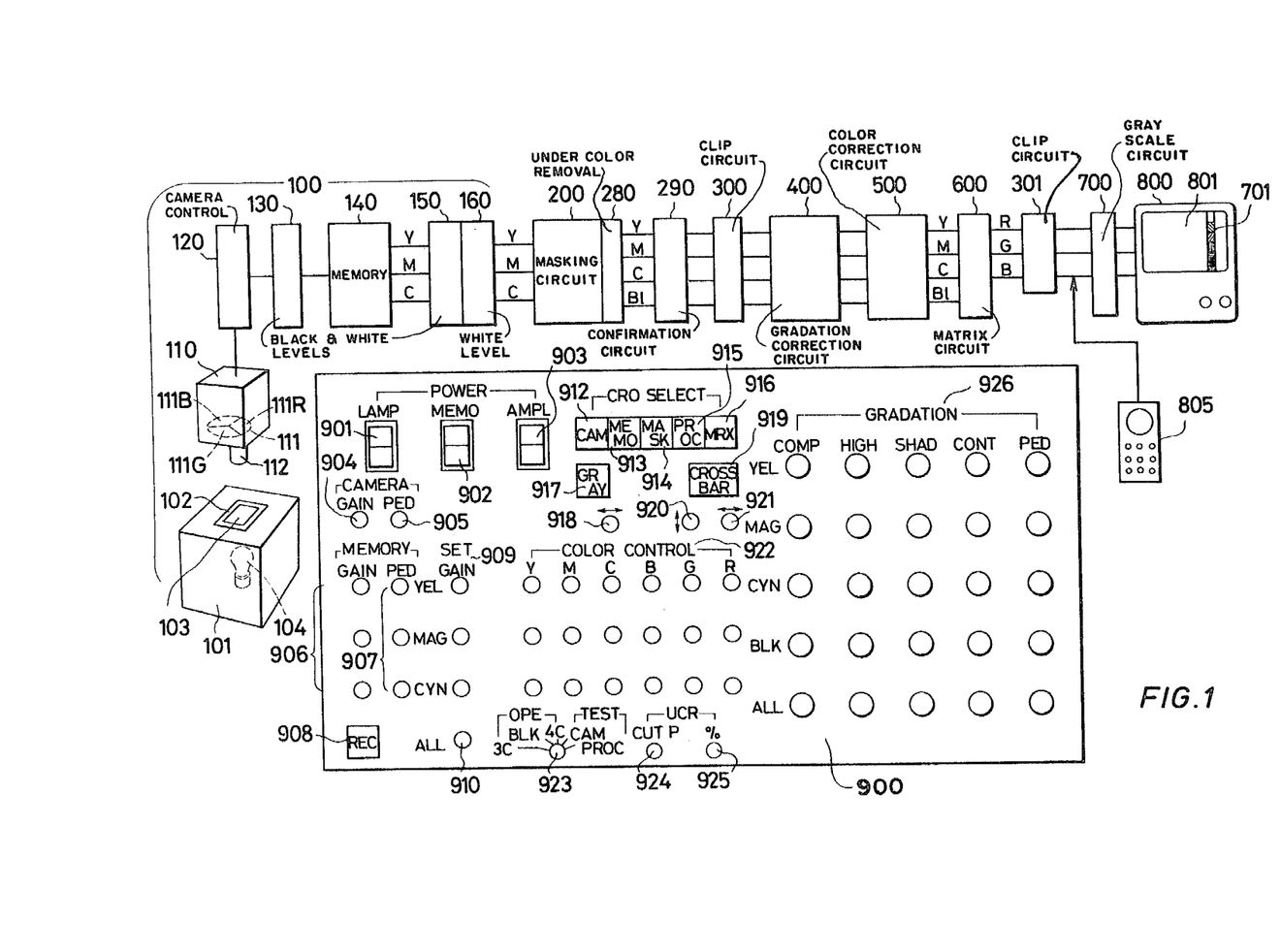
FIG. 1 is a block diagram of one embodiment of the color separation condition determining apparatus, including a schematic plan view of the operation panel according to the presnet invention.

FIG. 1 shows the apparatus of the present invention in a block diagram. A color original is scanned in a scanning section 100 which produces synchronous Y, M and C image signals. A scanning bed 101 is provided with a light source 104 having a stable light quantity and a light diffusion sheet. Placed on the diffusion sheet is a film stand 102 made of a transparent glass plate. A color original 103 to be printed such as a color film is put on the film stand 102. The color original 103 may be of positive type or negative type. Above the film stand 102, a television camera 110 is installed to scan the color original 103.

In front of the camera tube of the television camera 110, a filter 111 of three colors R, B and G is built in, and attached in front of which is a zoom lense 112. The filter 111 is provided with color filter elements of red 111R, green 111G and blue 111B, each of which occupies an angle of 120°. The filter 111 is rotated about its center in synchronism with the scanning of each color. For example, when the original is scanned through the filter element 11B, Y signals are obtained. Likewise, the M signals are obtained through the filter element 111G and the C signals, through the filter element 111R.

The image signals of the color original 103 that are obtained in the above scanning are stored in a memory 140 after being passed through a camera control 120 and a black and white level control circuit 130. The camera control 120 performs the beam adjustment for converting the image signals into positive type signals and performs the electrical focusing and nega-posi conversion. In the black and white level control circuit 130, the output reference signals of 0% and 100% delivered by the camera are adjusted to their respective correct 0% and 100% levels by means of knobs 904 and 905. That is, the control circuit 130 is operated as a function of such factors as variation of light intensity and fading of filter elements. The memory 140 stores the scanned image signals Y, M and C sequentially. In this embodiment, a magnetic disc memory is employed, but an IC memory may be used instead.

In the above camera scanning, when a record switch 908 on the control panel 900 is depressed, the filter 111 is automatically rotated by an electric motor and the respective Y, M and C image signals of the color original 103 are stored in the memory 140. The output signals delivered by the memory 140 are converted into image signals of a certain level range by the black and white level control circuit 150 through the manipulation of knobs 906 and 907. The black and white level control circuits 130 and 150 control the output signals relative to the reference signals, that is, they keep the image signals within a certain level range in the system.

The output signals of the control circuit 150 are further led into a white level control circuit 160 in which the white level of the input signal is regulated by means of the knobs 909 and 910.

It should be mentioned that in this embodiment, the Y, M and C color image signals are obtained by rotating a filter device in a single camera, the signals are stored in the memory and the three color image signals are delivered synchronously from the memory, that is, the so-called sequential memorizing system. It should be noted, however, that the synchronous three color image signals can be obtained without the use of a memory device if three image pickup tubes are used. The problems caused by variation in quality that is often found among different cameras are absent from the system of this embodiment, with the result that the control operation is easier, and maintenance of the system is also simplified.

The synchronized Y, M and C image signals are applied to a masking circuit 200 from the memory 140 via the control circuits 150 and 160. The masking circuit 200 receives the Y, M and C image signals, detects the yellow, magenta, cyan, blue, green and red components and performs the correction of the several color components. A device of this kind is used in color scanners.

The control knobs 922 are used for correcting the yellow, magenta, cyan, blue, green and red components.

A U.C.R. (under-color removal) circuit 280 is connected to the output of the masking circuit 200, and a U.S.R. control confirmation circuit 290 is connected to the U.C.R. circuit 280. The conformation circuit 290 judges whether the rate of U.C.R. and Bl separation, which have been set by means of the control knobs 924 for the cut points of U.C.R. and the control knobs 925 for the percentages of U.C.R., are proper or not. More particularly, by manipulating the changeover knob 923, it is possible to develop on the color monitor the combined image of Y, M and C, the image of Bl alone, or the combined image of Y, M, C and Bl.

The image signals of Y, M. C and Bl are then applied to a clip circuit 300. In the masking circuit 200, the image signals of Y, M, C and Bl may be added to or subtracted from one another, or they may be multiplied by appropriate correction factors, so that the image signals of Y, M, C, and Bl are mixed with the signal components of below or above the 0% to 100% level range. Clip circuit 300 clips whichever of these electric signals are outside the range of 0% to 100%. The clip circuit 301 in a later stage is also provided for the same purpose.

A gradation correction circuit 400 corrects the gradation of the Y, M, C and Bl image signals. When the correction knobs 926 are manipulated, the compression, highlight, shadow, contrast and pedestal levels of each image signal are varied.

The color correction circuit 500 converts the respective image signals of Y, M, C and Bl of the printing system into the image signals of Y, M, C and Bl of the color monitor. More particularly, when the Y, M, C and Bl signals of the printing system are converted into the image signals of R, B and G by the matrix circuit, the areas having secondary, tertiary and quaternary colors become dark or blackish. To remedy this, some degree of each of the secondary, tertiary and quaternary color components must be removed from the former Y, M and C signals, thereby lightening the secondary, tertiary and quaternary colors and making the areas of secondary, tertiary and quaternary colors on the color monitor closely resemble the colors actually printed.

As the color correction circuit, the secondary and tertiary color correction circuit disclosed in U.S. Pat. No. 3,972,066 may be employed. Further, the secondary, tertiary and quaternary color correction circuit as disclosed in the later part may also be used, which provides superior results.

The matrix circuit 600 calculates the color components contained in the respective color image signals of Y, M, C and Bl and converts them into R, G and B image signals. This matrix circuit is disclosed in U.S. Pat. No. 3,972,066, issued to the present applicant, and in other references, and accordingly, detailed description thereof will be omitted. The output signals from the matrix circuit 600 are applied to the color monitor 800, which employs a color CRT, via a gray scale mixing circuit 700. In order to perform comparative inspection of color density (particularly highlight color density) on the screen 801 of the color monitor with a gray scale 701, the gray scale 701 indicated on the screen can be moved by the gray scale mixing circuit 700.

It is difficult to determine the densities of colors on the screen 801, but this problem can be solved by developing a suitable gray scale on the same screen. Accordingly, the density of the color to be printed can also be seen from the color that is shown on the monitor screen.

An oscilloscope 805 is used for observing the wave forms of input signals and corrected curves, and the densities of signals at various positions. In the drawing, the input terminal of the oscilloscope 805 is connected to the output terminal of the clip circuit 301, but it can be connected to various other stages by means of the changeover switches 912 to 916.

In the following, the components of the apparatus of the invention will be described in detail.

Figure 2:
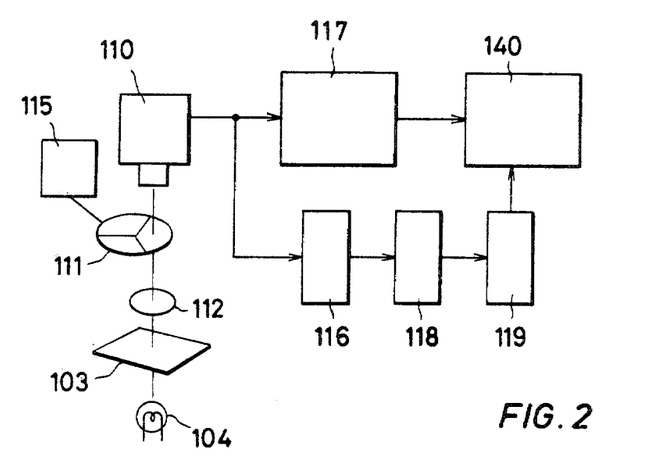
FIG. 2 is a block diagram showing the rotating mechanism of a filter device.

FIG. 2 shows a block diagram of the filter 111 and other devices that rotate the Y, M and C filter 111 built in the camera 110 synchronously with the scanning of the original image. The light source 104 illuminates the color original 103. The color original 103 is scanned by a monochromatic camera tube 110 through the filter disc 111 having filter elements of 111R, 111G and 111B rotated by an electric motor 115. The image signals which are taken by the monochromatic camera tube 110 are applied to image signal amplifying circuits 116 and 117 to be amplified. The output signals from the image signal amplifying circuit 116 are applied to the clip circuit 118, which functions as a comparator. The image signals which are regulated in the clip circuit 118 are applied to a logic circuit 119, in which the control signals are produced, which signals are used when the output image signals delivered by the image signal amplifying circuit 117 are stored in the memory device 140.

Figure 3:
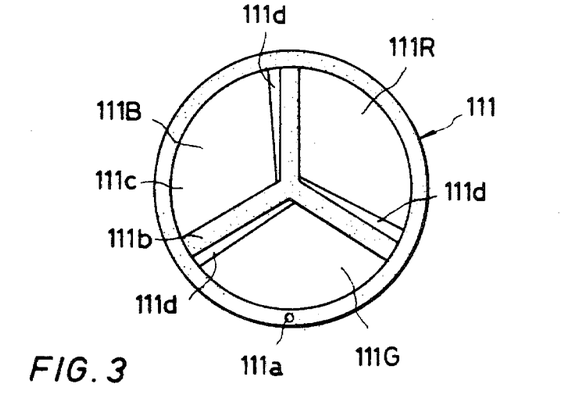
FIG. 3 is a plan view of a filter disc.
Figure 4:
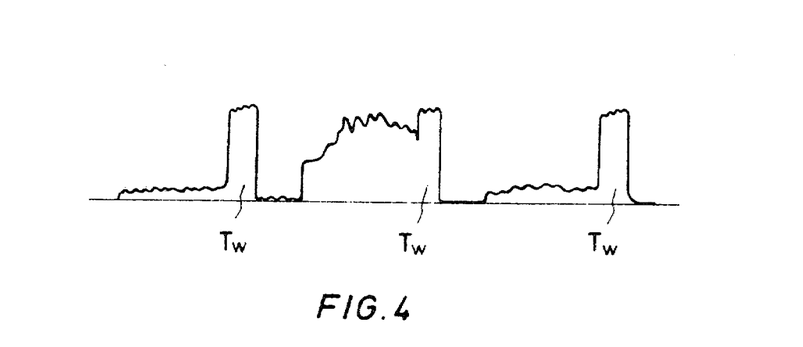
FIG. 4 is a wave form chart obtained by using the filter device shown in FIG. 2.

FIG. 3 shows the details of the filter disc 111. A hole 111a is defined in the filter disc 111 and apertures 111d are formed between spokes 111b and the attached filter elements 111c. The light rays from the light source 104 can be passed through the apertures 111d by way of the color original 103. The apertures 111d are holes or transparent plates having a certain density, such as gray scales different from the R, G and B monochromatic filters. With this filter disc 111, the output image signals shown in FIG. 4 are obtained by the monochromatic camera tube 110. More particularly, in the periods Tw, which correspond to the apertures 111d, the signal level is higher than the signals generated by light passing through the filters 111c. By discriminating such by means of the clip circuit 118, which has a clip voltage $V_{CLP}$, rotation timing pulses having a cycle corresponding to the rotational speed of the filter disc 111 can be obtained. Further, since the apertures are disposed at regular intervals of 120°, when a color image is recorded by means of the signals output by the clip circuit 118, the image signals, that is, the picture images, are not affected adversely because the signals corresponding to the apertures 111d and to the boundaries 111b are not recorded in the memory device 140.

The hole 111a in the rim of the filter disc 111 is used to pass a reset pulse after each rotation of the filter disc 111.

As described above, the filter disc 111 having the above structure does not need the hole 111a for the rotational speed to be determined, so that the hole 111a does not have to be made at any special location around the circumference of the disc 111. Furthermore, unfading gray scales are fitted into the apertures and periodically observed for comparison with the light rays transmitted through the filters R, G and B, and thus the degree of fading in each of the filters R, G and B can be determined.

Figures 5, 6:
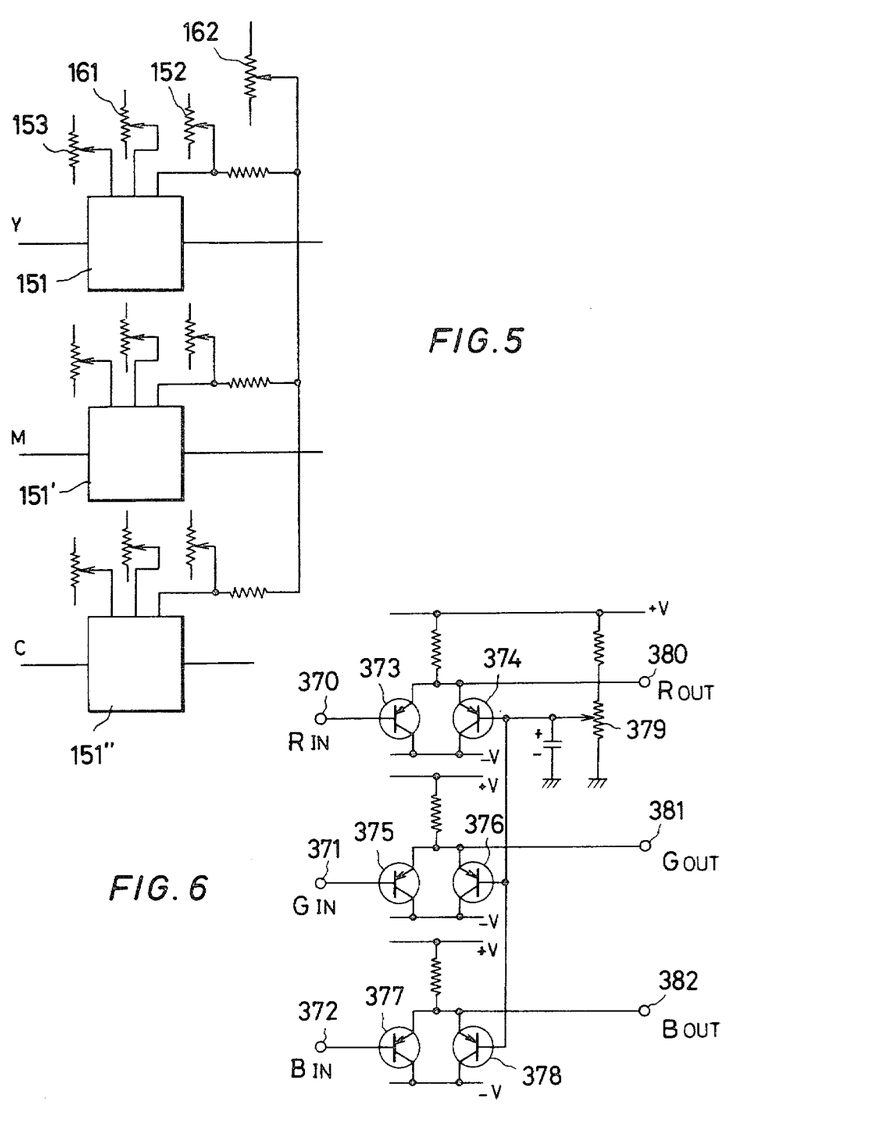
FIG. 5 is a diagram of black and white level controlling circuits and white level controlling circuits for color image signals.
FIG. 6 is a diagram of clip circuits.

The black and white level control circuit 150 and the white level control circuit 160 are shown in FIG. 5. The input, for example, Y signals, is applied to a gain control circuit 151 and is regulated by variable resistors 152, 153, 161 and 162, whereby its level is controlled. The variable resistor 152 is connected to the GAIN knob 906 of the memory, the variable resistor 153 is connected to the PED knob 907 of the memory, the variable resistor 161 is connected to the GAIN knob 909 of the SET, and the variable resistor 162 is connected to the ALL knob 910 of the SET.

Further, the black and white control circuit 130 is also provided with a regulating circuit (a gain control circuit), so that the adjustment is possible by means of the GAIN knob 904 and the PED knob 906 of CAMERA (see FIG. 1). Inputs of 0% level signals and 100% level signals are applied to the camera 110 and the outputs of each stage are adjusted to the range of 0% to 100%, whereby the constant state of camera scanning is achieved.

Still further, since the portions to be printed as white have different densities depending on the scanning conditions of the color original 103, it is necessary to determine the level of density of the color original that must be printed white (i.e. left the color of the surface to be printed). This level is set by means of the SET GAIN knobs 909 and 910.

The clip circuits 300 and 301 will now be described. As described in the foregoing, when several electric signals are treated variously by adding, subtracting and multiplying, signals outside the range of 0% to 100% are produced. If signals over 100% level are produced, especially the fluorescent substance of the Braun tube of the monitor 800 continues light emission until it is saturated and the portions which ought to be white do not do so but are colored, or color reversal occurs. To prevent this, signals which exceed about the 100% level are clipped. In practice, the clipping is made at the 102% level.

It should be noted that the positions of the clip circuits are not restricted to those shown in FIG. 1, and that it is possible to employ as few as one clip circuit.

Shown in FIG. 6 is an embodiment of the clip circuit 301. The reference numerals 370, 371 and 372 denote input terminals for R signals, G signals and B signals, respectively. The reference numerals 373-378 denote transistors, 379 denotes a variable resistor, and 380, 381 and 382 denote the output terminals for R signals, G signals and B signals, respectively.

In the operation of the device shown in FIG. 6, a clip voltage is applied to the transistors 374, 376 and 378 through the variable resistor 379, and the emitters and the collectors of the transistors are connected in common with those of other transistors 373, 375 and 377 respectively. When the input signals of R, G and B are applied to the transistors 373, 375 and 377 by way of the input terminals 370, 371 and 372, the output signals obtained from the output terminals 380, 381 and 382 are clipped. The other clip circuit 300 is used for four-image signals and it functions in the same way as the circuit of FIG. 6.

In the aforementioned U.S. Pat. No. 3,972,066 issued to the present applicants, it is described how the image on the color monitor can be made more similar to the printed image by correction of the secondary and tertiary colors during the conversion of printing type image signals into video type image signals. The secondary and tertiary color components of the input Y, M and C signals are decreased to attain the desired colors on the monitor. Since the image can be corrected well even if only the secondary and tertiary colors are corrected, the apparatus of the present invention may be provided with a secondary and tertiary color correcting circuit, but in order to obtain superior results, a secondary, tertiary and quaternary color correcting circuit may be provided instead.

Figure 7:
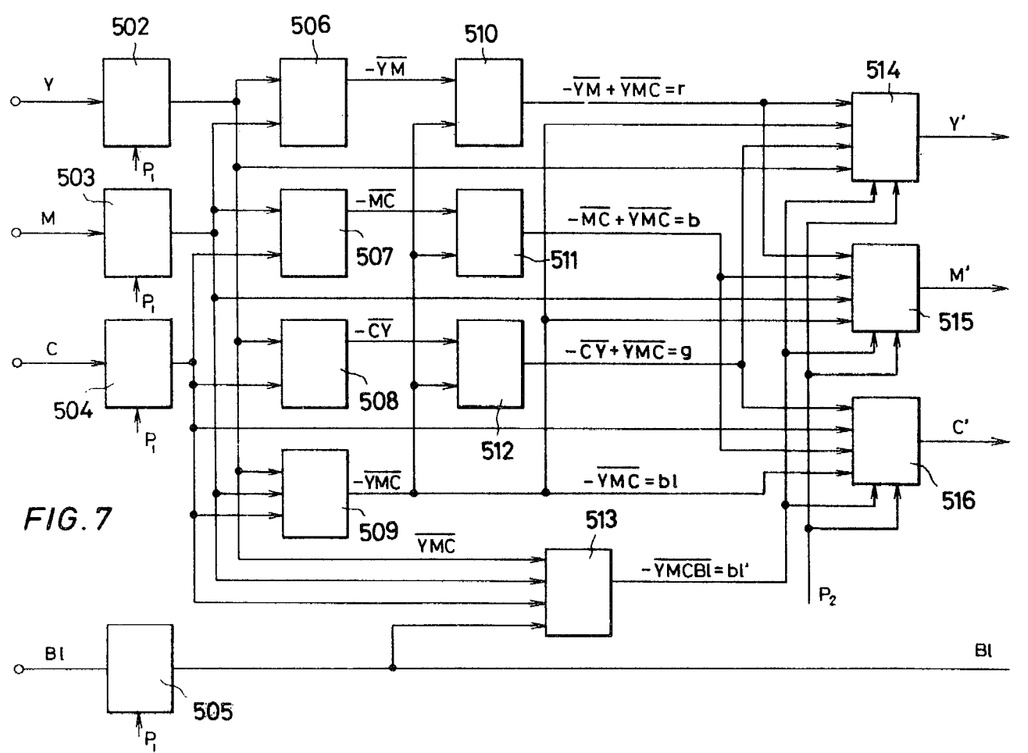
FIG. 7 is a block diagram of color correcting circuits.

FIG. 7 is a block diagram of a secondary, tertiary and quaternary color correction circuit. As input Y, M, C and Bl image signals are applied to clamping output amplifiers 502, 503, 504 and 505 and the 100% level of each of the image signals is fixed to a certain d.c. voltage, and the pulses $P_1$ having a level corresponding to the 100% level of Y, M, C and Bl are added to the retrace periods of the image signals. These Y, M, C and Bl image signals have reversed levels so that a high signal level represents a low density.

The outputs from the clamping output amplifiers 502-504 are applied to secondary composite signal detecting circuits 506-508. These circuits 506-508 include maximum value NAM (non-additively mixing) circuits. Accordingly, secondary color signals $-\overline{YM}$, $-\overline{MC}$ and $-\overline{CY}$ are obtained from circuits 506-508, respectively.

The outputs of the clamping output amplifiers 502-504 are also applied to a tertiary color composite signal detecting circuit 509, which also contains a NAM circuit, and which produces a tertiary color signal $-\overline{YMC}$.

The reference numerals 510-512 denote pure secondary color composing circuits which remove tertiary color components from secondary color components. By receiving the above-mentioned secondary color signals $-\overline{YM}$, $-\overline{MC}$ and $-\overline{CY}$ and the signal $-\overline{YMC}$ as input, the circuits produce the outputs $-\overline{YM}+\overline{YMC}$, $-\overline{MC}+\overline{YMC}$ and $-\overline{CY}+\overline{YMC}$.

The quaternary color composing circuit 513 also includes a NAM circuit, and it receives the inputs Y, M, C and Bl to produce quaternary color signal $-\overline{YMCBl}$.

The pure secondary color components will be represented herein by r, g and b, the tertiary color component, by bl, and the quaternary color component, by bl'. These secondary, tertiary and quaternary color components are applied as input to the adders 514-516 and the secondary, tertiary and quaternary color components are multiplied by correction factors of $\alpha$, $\beta$, $\gamma$, $\delta$, and $\epsilon$, thereby completing the correction of the original image signals Y, M and C.

If the corrected Y, M and C signals are represented by Y', M' and C', respectively, the functions may be shown by the following equations:

$$Y' = Y + r \times \alpha + g \times \beta + bl \times \delta + bl' \times \epsilon$$

$$M' = M + r \times \alpha + b \times \gamma + bl \times \delta + bl' \times \epsilon$$

$$C' = C + g \times \beta + b \times \gamma + bl \times \delta + bl' \times \epsilon$$

In the above equations Y, M and C are reversed image signals and r, g, b, bl and bl' are positive secondary, tertiary and quaternary color signals, so that the right sides of the above equations imply that some proportion of each of the secondary, tertiary and quaternary color components is subtracted from the image signals of Y, M and C.

As a result of correction with the above-described correction circuits 500, the portions of secondary, tertiary and quaternary color components of the image that are shown on the color monitor 800 become brighter, and the monitor image is practically exactly the image that is actually printed.

The masking circuit 200 will now be described. Even though the conventional masking circuits of color scanners may be used, a new type of masking circuit will be proposed herein.

Figures 8, 9, 10:
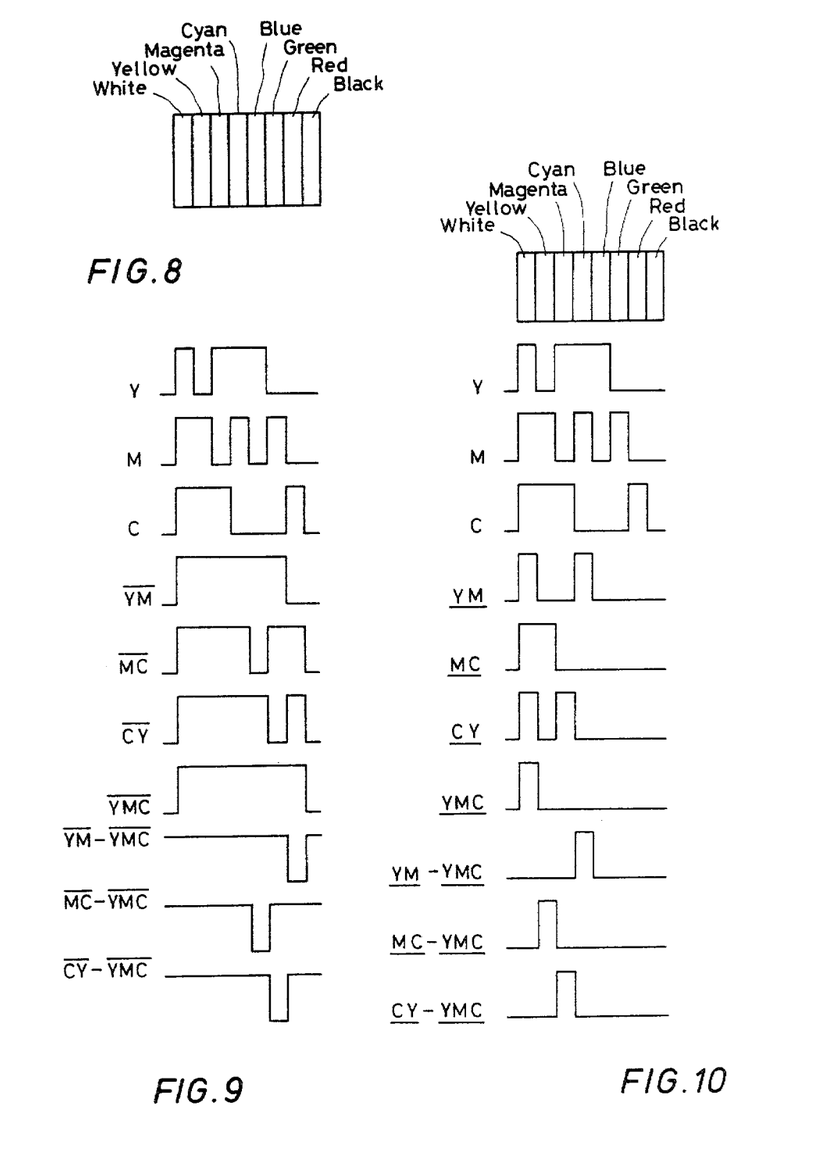
FIG. 8 is a schematic illustration of color bars.
FIG. 9 and FIG. 10 are charts of image signals.

Shown in FIG. 8 are color bar images. When the color bars are scanned by a video camera and converted into electric signals, the Y, M and C signals shown in FIG. 9 are obtained. The Y, M and C image signals are reversed signals, so that if the density of a given component is high, the signal level is low.

The present invention is described with reference to the color correction signal diagram of FIG. 10. By using circuits which detect only the signals of minimum levels and produce outputs (minimum value NAM), the input signals of Y, M and C as shown in FIG. 10 are detected and the minimum NAM signals of FIG. 10, $\overline{YM}$, $\overline{MC}$ and $\overline{CY}$, are obtained by the combination of Y and M, M and C, and C and Y. Further, the minimum NAM signal, $\overline{YMC}$ of the combination of Y, M and C is also obtained.

As shown in FIG. 10, it should be noted that $\overline{YMC}$ contains all the colors other than white of the color bars and that $\overline{YM}$ contains all the colors other than white and cyan. Therefore, $\overline{YM} - \overline{YMC}$ is the reverse signal of cyan. In like manner as above, the reversed signal of yellow and the reversed signal of magenta are respectively detected $\overline{MC} - \overline{YMC}$ and $\overline{CY} - \overline{YMC}$. Thus, the colors of cyan, yellow and magenta can be corrected separately by multiplying proper factors.

Figure 11:
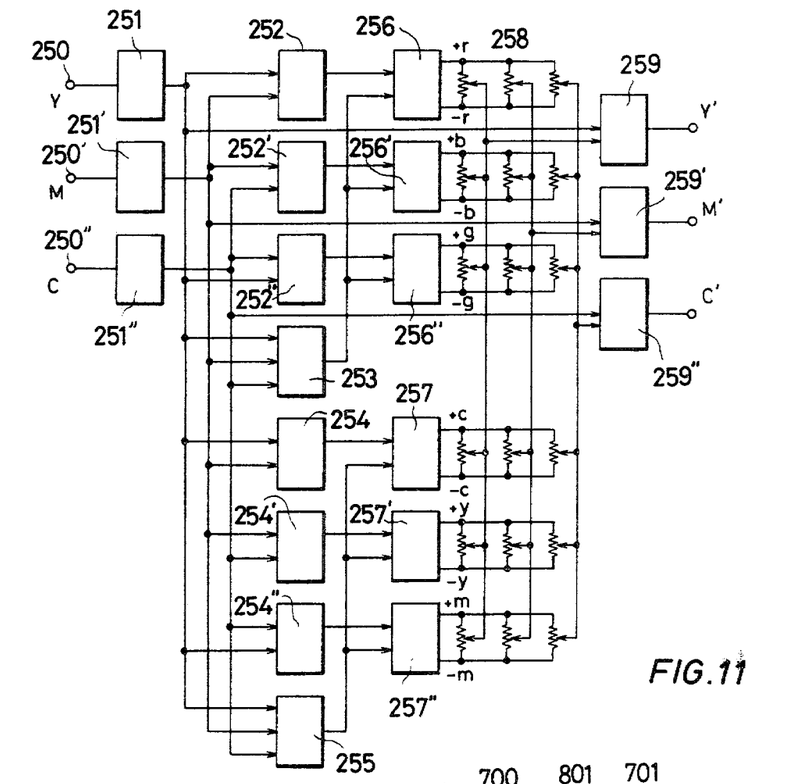
FIG. 11 is a block diagram of the masking circuit.

FIG. 11 shows a block diagram of one embodiment of the masking circuit. In FIG. 11, the reference numerals 251, 251' and 251'' denote clamping output amplifiers, 252, 252', 252'' and 253 denote maximum value NAM circuits, 254, 254', 254'' and 255 denote minimum value NAM circuits, 256, 256', 256'', 257, 257' and 257'' denote circuits for addition and positive and negative correction signal generation, 258 denotes a control circuit, and 259, 259' and 259'' denote addition circuits.

The Y, M and C signals of FIG. 9 and FIG. 10 are applied to the input terminals 250, 250' and 250'', respectively, in FIG. 11. The reference numerals 251, 251' and 251'' are clamping output amplifiers which fix the Y, M and C signals to a selected suitable d.c. voltage. The outputs of clamping output amplifiers 251, 251' and 251'' are connected to maximum value NAM circuits 252, 252', 252'' and 253, and minimum value NAM circuits 254, 254', 254'' and 255. The maximum value NAM circuits 252, 252', 252'' and 253 output the signals $\overline{YM}$, $\overline{MC}$ and $\overline{CY}$ of FIG. 9, and at the same time, they detect the $\overline{YMC}$ signal and invert it to produce a $-\overline{YMC}$ signal. Similarly, the minimum value NAM circuits 254, 254', 254'' and 255 output the signals $\underline{YM}$, $\underline{MC}$ and $\underline{CY}$ of FIG. 10, and at the same time, they detect the $\underline{YMC}$ signal and invert it to produce a $-\underline{YMC}$ signal. The reference numerals 256, 256' and 256'' denote addition and negative and positive correction signal generating circuits, in which the outputs of maximum value NAM circuits 252, 252' and 252'' and the output of the fourth maximum value NAM circuit 253 are added together to produce negative and positive correction signals $\{-(\overline{YM}-\overline{YMC}), \overline{YM}-\overline{YMC}\}$, $\{-(\overline{MC}-\overline{YMC}), \overline{MC}-\overline{YMC}\}$, and $\{-(\overline{CY}-\overline{YMC}), \overline{CY}-\overline{YMC}\}$. The reference numerals 257, 257' and 257'' also denote addition and negative and positive correction signal generating circuits, in which the outputs of the minimum value NAM circuits 254, 254' and 254'' and the output of the fourth minimum value NAM circuit 255 are added together to produce negative and positive correction signals $\{-(\underline{YM}-\underline{YMC}), \underline{YM}-\underline{YMC}\}$, $\{-(\underline{MC}-\underline{YMC}), \underline{MC}-\underline{YMC}\}$, and $\{-(\underline{CY}-\underline{YMC}), \underline{CY}-\underline{YMC}\}$.

The relations between the correction signals and colors are as follows:

| | |
|---|---|
| $\overline{YM} - \overline{YMC} = r$ | (red color) |
| $\overline{MC} - \overline{YMC} = b$ | (blue color) |
| $\overline{CY} - \overline{YMC} = g$ | (green color) |
| $-(\underline{YM} - \underline{YMC}) = c$ | (cyan color) |
| $-(\underline{MC} - \underline{YMC}) = y$ | (yellow color) |
| $-(\underline{CY} - \underline{YMC}) = m$ | (magenta color) |

The reference numeral 258 denotes control circuits, which determine the addition ratios of the output correction signals $\pm r$, $\pm b$, $\pm g$, $\pm c$, $\pm y$ and $\pm m$ generated by circuits 256, 256', 256'', 257, 257' and 257'' to the signals Y, M and C of FIGS. 9 and 10. The reference numerals 259, 259' and 259'' denote addition circuits. In the addition circuit 259, the output of the clamping output amplifier 251 and the controlled correction signals of r, b, g, c, y and m from the control circuit 258 are added (or subtracted) to generate the corrected Y' signal. In like manner, the addition circuits 259' and 259'' add (or subtract) the controlled correction signals from the control circuits 258 to (or from) the outputs of the clamping output amplifiers 251' and 251'', respectively, to generate the corrected M' and C' signals.

The present invention will be described further taking cyan as an example. When the cyan color of FIG. 8 is reproduced on the color monitor, the portions of Y, M and C signals of FIG. 10 which correspond to the cyan color are supplied to the color monitor. When the portions of Y, M and C signals of FIG. 9 corresponding to cyan are varied in signal ratios, the brightness, saturation and hue of the cyan color on the color monitor can be changed.

In FIG. 10, $-(\underline{YM}-\underline{YMC})=c$ is cyan. The addition or subtraction ratio of the positive or negative correction signal to the cyan color generated by the correction signal generating circuit 257 of FIG. 11 is regulated by the control circuit 258, after which the correction signal is added to Y, M and C signals by the addition circuits 259, 259' and 259'' to produce Y', M' and C' signals. Further, the signals Y', M' and C' of FIG. 11 are applied to the color monitor and the cyan color is controlled by means of the control circuit 258, thereby controlling the brightness, saturation and hue of the cyan color. When a correction signal of +c is added to the signal C of FIG. 10, the cyan in FIG. 8 becomes white. On the other hand, when a −C correction signal is added to the Y and M signals, the cyan in FIG. 8 becomes black.

By means of the above-described masking circuit, the colors of cyan, magenta and yellow are detected separately, and the respective lightness, saturation and hue of the red, green, blue, cyan magenta and yellow components can be varied without changing the achromatic color portions. Accordingly, this masking circuit is quite effective.

Figure 12:
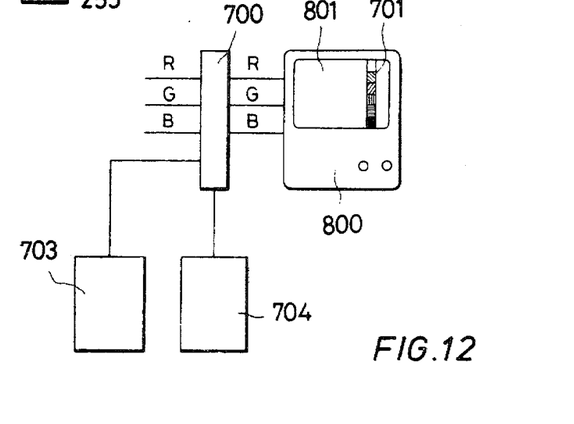
FIG. 12 is a block diagram of the circuits for indicating a gray scale on a color monitor.

The gray scale mixing circuit 700 will now be described. As shown in FIG. 12, gate pulses are generated at each horizontal or vertical period by a gray scale gate pulse generator 703 a portion of the image signals that are applied to the gray scale generating circuit 700 is extracted and added to the gray scale signal that is produced by the gray scale signal generator 704. In this manner, the gray scale is shown on the color monitor 800.

This gray scale 701 can be developed on the color monitor screen, or, if it is not desired, the gray scale 701 can be eliminated by means of the switch 917. The gray scale also can be moved horizontally on the screen by a knob 918.

Though the density measuring device is not described in the above disclosure with regard to the correction condition determining apparatus of the present invention, the density measuring device as disclosed in U.S. Pat. No. 4,123,171 filed by the present applicant, may be built in the apparatus of the present invention. A switch 919 is used to measure the density of a small area of the color original 103, and knobs 920 and 921 are used to shift, horizontally or vertically, the small area to be measured.

Further, though not described above, as disclosed in U.S. Pat. No. 3,972,066, several correction conditions can be separately selected according to the printing system employing the apparatus of the present invention, such as the method of printing, the kind of ink and paper, and so forth.

The method for using the apparatus of the present invention for determining the correction conditions of color separation will be described in the following.

The signal treatment system of the present apparatus is made constant by setting all the color control knobs 922 and the gradation 926 to zero, then by regulating the input standard density signals by means of knobs 904, 905, 906 and 907. The correction factors are adjusted in accordance with the employed system of printing.

After that, a color original 103 to be printed is put on the film stand 102. Further, the set gain knobs 909 and 910 are adjusted to determine the white level and to permit observation of the image developed on the color monitor 800.

If the image on the monitor is not as desired, an adequate image is produced by manipulating the color control knobs 922 and gradation knobs 926. It goes without saying that, when the quality of the image on the color monitor is judged, the above-mentioned gray scale 701 and density meter may be employed if necessary.

Although the present invention has been described in connection with a preferred embodiment thereof, many variations and modifications will now be apparent to those skilled in the art. The scope of the present invention is limited, therefore, not by the specific details of the preferred embodiment described herein, but only by the terms of the appended claims.

What is claimed is:

1. A color separation condition determining apparatus having a color monitor for use with a color monitor capable of presenting on a screen a color reproduction to be obtained from a color original to be reproduced by a color printing process, said color monitor means being capable of displaying colors with a given range of color densities on said screen; said apparatus comprising:

scanning means for scanning a color original and for generating first, second and third electrical signals representative of three primary color components of said color original, respectively;

masking circuit means for modifying the relative strengths of said electrical signals;

under color removal circuit means for performing under-color removal from said signals of a component representative of the black component of said color original;

gradation correction circuit means for correcting the gradations of each of said first, second and third electrical signals;

color correction circuit means for subtracting from each of said 1st, 2nd, and 3rd electrical signals secondary, tertiary and quaternary components derived from said signals and weighted by respective selected factors;

matrix circuit means for converting said electrical signals into 4th, 5th and 6th electrical signals representative respectively, of red, blue and green components of said color original, as said color original is to be reproduced on said color monitor means;

means for applying said fourth, fifth and sixth electrical signals to said color monitor such that said color monitor displays an image determined thereby; and clip circuit means for clipping the portions of said first, second and third electrical signals at about a preselected 100% level, whereby no color densities above a preselected portion of said range of color densities is displayed on said screen.

2. A color separation condigion determining apparatus as claimed in claim 1, wherein said clip circuit means clips said first, second and third signals before said first, second and third signals are either gradation-corrected by said gradation correction circuit means or color-corrected by said color correction circuit means.

3. A color separation condition apparatus as claimed in claim 1, wherein said primary color components are yellow, magenta and cyan components.

4. A color separation condition apparatus as claimed in claim 3, wherein said under-color removal circuit means further generates a 7th electrical signal representative of said black component of said color original; and wherein said clip circuit means also clips said 7th electrical signal; and wherein said gradation correction circuit means corrects the gradation of each of said 1st, 2nd, 3rd and 7th electrical signals, and wherein said matrix circuit means converts said 1st, 2nd, 3rd and 7th electrical signals to said 4th, 5th and 6th electrical signals.

5. A color separation condition determining apparatus as claimed in claim 4, wherein said scanning means further comprises a single camera, and wherein said 1st, 2nd and 3rd electrical signals are sequentially obtained by scanning said color original with 1st, 2nd and 3rd filter elements for obtaining said 1st, 2nd and 3rd signals, respectively, and wherein said 1st, 2nd and 3rd signals are sequentially stored in a memory device, and are then synchronously output by said memory device to be input to said masking circuit means.

6. A color separation condition determining apparatus as claimed in claim 5, further comprising a filter disc comprising said 1st, 2nd and 3rd filter elements, and 1st, 2nd and 3rd aperture portions that allow the passage without significant attenuation of light the average intensity of which is significantly greater than that of said three primary color components of said color original; each of said aperture portions being located between two of said filter elements, whereby timing pulses indicating the rotational speed of said filter disc are obtained.

7. A color separation condition determining apparatus as claimed in claim 5 or 4, wherein said scanning means further comprises a black and white level control circuit means for maintaining the white level and the black level, as represented by at least said 1st, 2nd and, 3rd electrical signals, each constant.

8. A color separation condition determining apparatus as claimed in claim 5 or 4, further comprising gray scale mixing circuit means for providing a scale of predetermined densities on said screen of said color monitor.

9. A color signal correcting method, comprising the steps of:
receiving primary electrical signals representative, respectively, of yellow, magenta, cyan and black components of a color original
generating by means of non-additive mixing a secondary electrical signal from each pair of those of said primary electrical signals representing said yellow, magenta and cyan components of said color original;
generating by means of non-additive mixing a tertiary electrical signal from said primary electrical signals representing said yellow, magenta, cyan components of said color original;
generating a respective pure secondary electrical signal corresponding to each of said secondary electrical signals by subtracting said tertiary signal from the corresponding one of said secondary signals;
generating by means of non-additive mixing a quaternary electrical signal from all four of said primary electrical signals;
multiplying each of said pure secondary signals, said tertiary signal and said quaternary signal by respective correction factors; and
subtracting respective ones of the products of a correction factor and a pure secondary, tertiary or quaternary signal from each of said primary signals corresponding to said yellow, magenta and cyan components to produce corrected primary signals.

10. A masking device comprising:
means for non-additively combining in pairs three primary electrical signals, each representative of a respective one of the yellow, magenta and cyan components of a color original to produce three electrical signals YM, MC and CY by selecting the smaller of the two primary signals being combined in a given pair of said primary signals;
means for combining said three primary signals to produce an electrical signal YMC by selecting the smallest of said three primary signals;
means for generating each of three additional signals representative, respectively, of yellow, magenta and cyan color components by subtracting said YMC signal from a respective one of said YM, MC and CY signals; and
means for correcting each of said additional signals to correct the hue, the saturation, and the brightness of the color component represented by the corresponding primary signals to remove unwanted spectral characteristics of said primary signals.

11. A masking device comprising:
means for combining in pairs three primary electrical signals respectively representative of yellow, magenta and cyan components of a color original, by selecting the smaller of the two primary signals of a given pair of said primary signals, to produce 1st, 2nd and 3rd minimum selected electrical signals, and for combining said primary signals in pairs by selecting the larger of the two primary signals of a given pair of said primary signals, to produce 1st, 2nd and 3rd maximum selected electrical signals;
means for combining said three primary signals by selecting the smallest and the largest of said three primary signals to produce respectively, a 4th minimum-selected and a 4th maximum-selected electrical signal;
means for generating 1st, 2nd and 3rd modified electrical signals by subtracting said 4th minimum-selected signal from said 1st, 2nd and 3rd minimum-selected signals, respectively, and for generating 4th, 5th and 6th modified electrical signals by subtracting said 4th maximum-selected signal from said 1st, 2nd and 3rd maximum-selected signals, respectively;
means for correcting each of said modified signals to correct the hue, the saturation, and the brightness of the colors respectively represented by said six modified signals to generate six corrected signals thereby to remove unwanted spectral characteristics of said primary signals.

12. A color separation apparatus comprising a rotatable filter disc having 1st, 2nd and 3rd filter elements for detecting respective 1st, 2nd and 3rd primary color components of a color original, and having a respective aperture portion located between each two of said filter elements, said aperture portions allowing the passage without significant attenuation of light the average intensity of which is greater than that of said primary color components of said color original; whereby timing pulses indicating the rotational speed of said filter disc are obtained.

13. A color separation condition determining apparatus, comprising:
a color monitor having a screen;
means for displaying a color image on said screen of said color monitor representative of a color original; and
gray scale mixing circuit means for displaying on said screen of said color monitor a scale of predetermined densities.

* * * * *